(12) United States Patent
Ito

(10) Patent No.: US 7,867,668 B2
(45) Date of Patent: Jan. 11, 2011

(54) ELECTROLYTE LAYER FOR FUEL CELL, FUEL CELL, AND METHOD OF MANUFACTURING ELECTROLYTE LAYER FOR FUEL CELL

(75) Inventor: Naoki Ito, Yokohama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1022 days.

(21) Appl. No.: 10/593,232

(22) PCT Filed: Mar. 28, 2005

(86) PCT No.: PCT/JP2005/006542

§ 371 (c)(1), (2), (4) Date: Sep. 18, 2006

(87) PCT Pub. No.: WO2005/104276

PCT Pub. Date: Nov. 3, 2005

(65) Prior Publication Data

US 2007/0207357 A1 Sep. 6, 2007

(30) Foreign Application Priority Data

Apr. 23, 2004 (JP) ............................. 2004-127601

(51) Int. Cl.
*H01M 2/14* (2006.01)
*H01M 8/10* (2006.01)
(52) U.S. Cl. ..................... 429/491; 429/479; 429/516
(58) Field of Classification Search ............... None
See application file for complete search history.

(56) References Cited

U.S. PATENT DOCUMENTS

| | | | | |
|---|---|---|---|---|
| 3,407,095 A | * | 10/1968 | Juda et al. ................. 429/16 |
| 3,480,538 A | * | 11/1969 | Sturm ................. 204/290.01 |
| 5,434,024 A | * | 7/1995 | Ikeda et al. ................. 429/234 |
| 6,187,231 B1 | | 2/2001 | Sansone et al. |
| 6,468,684 B1 | * | 10/2002 | Chisholm et al. ............. 429/33 |
| 6,638,659 B1 | * | 10/2003 | Fenton et al. ................. 429/40 |
| 2002/0012822 A1 | | 1/2002 | Oyanagi et al. |
| 2003/0008190 A1 | | 1/2003 | Chisholm et al. |
| 2003/0104258 A1 | | 6/2003 | Haile et al. |

(Continued)

FOREIGN PATENT DOCUMENTS

DE     197 34 634 C1     1/1999

(Continued)

OTHER PUBLICATIONS

Shu-Hwa Lu et al., "Studies on Hydrogen-Permeable Nickel Membrane Fuel Cell," Extended Abstracts, Electrochemical Society. Princeton, New Jersey, US, vol. 87-2, pp. 291-292, Oct. 18, 1987.

(Continued)

*Primary Examiner*—Dah-Wei D Yuan
*Assistant Examiner*—Maria J Laios
(74) *Attorney, Agent, or Firm*—Oliff & Berridge, PLC

(57) ABSTRACT

A fuel cell is produced using a fuel cell electrolyte layer comprising a hydrogen-permeable metal layer 27 serving as the compact substrate through which the gas supplied to the electrochemical reaction passes, a porous layer formed on the hydrogen-permeable metal layer 27, and an inorganic electrolyte supported in the pores of the porous layer.

4 Claims, 2 Drawing Sheets

U.S. PATENT DOCUMENTS

2004/0043277 A1    3/2004    Ito et al.

FOREIGN PATENT DOCUMENTS

| DE | 101 01 315 A1 | 7/2002 |
|---|---|---|
| EP | 1 012 896 B1 | 10/2001 |
| EP | 1 168 475 A2 | 1/2002 |
| EP | 1 394 884 A2 | 3/2004 |
| EP | 1 619 736 A1 | 1/2006 |
| JP | A 4-345762 | 12/1992 |
| JP | A 5-299105 | 11/1993 |
| JP | A 10-294117 | 11/1998 |
| JP | A 2004-2114 | 1/2004 |
| WO | WO 98/14505 A | 4/1998 |
| WO | WO 02/11226 A2 | 2/2002 |

OTHER PUBLICATIONS

P. Hasler et al., "A novel Pd-Ag membrane anode for alkaline fuel cells suitable for $CO_2$-containing hydrogen," Journal of Power Sources, Elsevier Sequoia S.A. Lausanne, CH, vol. 45, No. 1, pp. 93-103, May 1, 1993.

Office Action issued in Canadian Patent Application No. 2,560,385; mailed Jul. 22, 2010.

\* cited by examiner

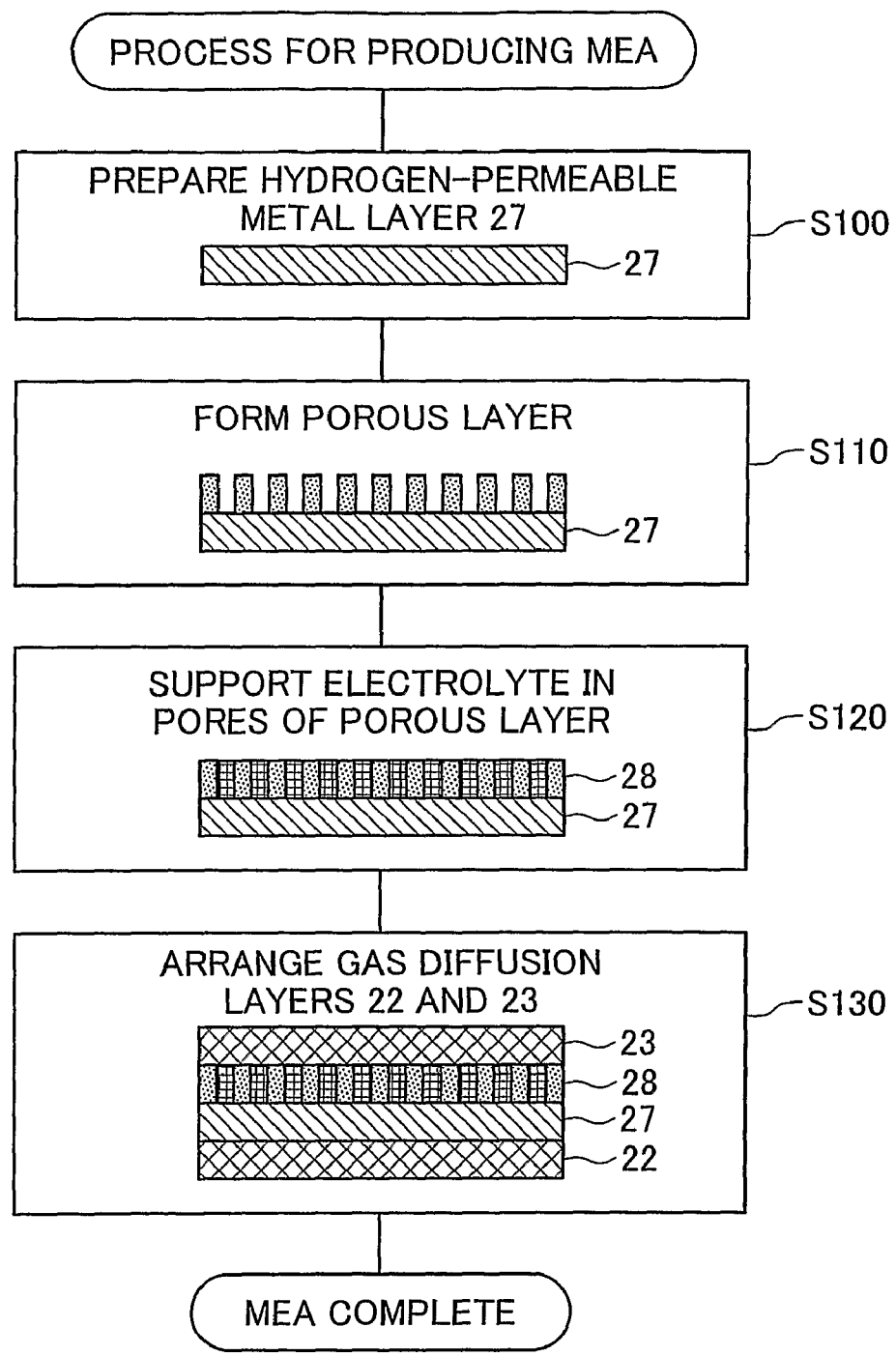

ELECTROLYTE LAYER FOR FUEL CELL, FUEL CELL, AND METHOD OF MANUFACTURING ELECTROLYTE LAYER FOR FUEL CELL

FIELD OF THE TECHNOLOGY

The invention relates to an electrolyte layer for a fuel cell, a fuel cell, and a method of manufacturing the electrolyte layer for a fuel cell.

BACKGROUND ART

Fuel cells having electrolyte layers with electrolyte supported in the pores of a porous element, such as electrolyte layers with electrolyte supported in the pores of silica gel, have been disclosed in the past.

When the electrolyte layer is formed by supporting the electrolyte in the pores of the porous carrier, the electrolyte layer must be thick enough to ensure that the electrolyte layer is gas-impermeable (to prevent cross leaking between the fuel gas and oxidizing gas). A problem, however, is that the resistance of the electrolyte layer increases as the thickness increases, resulting in lower cell performance. There is thus a need for a technique to improve cell performance with a thinner electrolyte layer while ensuring that the electrolyte layer is gas-impermeable.

DISCLOSURE OF THE INVENTION

In an effort to address the above problems in the prior art, an object of the present invention is to devise a thinner electrolyte layer while preserving the gas impermeability of the electrolyte layer in fuel cells having electrolyte layers with the electrolyte supported in the pores of the porous carrier.

To achieve the above object, a first aspect of the invention provides an electrolyte layer for a fuel cell. The electrolyte layer for a fuel cell in the first aspect of the invention comprises a compact substrate through which passes a gas supplied to the electrochemical reaction, a porous layer with fine pores that is formed on the substrate, and an inorganic electrolyte supported in the pores.

A second aspect of the invention provides a method of manufacturing an electrolyte layer for a fuel cell. The method of manufacturing an electrolyte layer for a fuel cell comprises preparing a compact substrate through which passes a gas supplied to the electrochemical reaction, forming a porous layer with fine pores on the substrate, and supporting an inorganic electrolyte in the pores.

According to the electrolyte layer for a fuel cell in the first aspect of the invention or the method of manufacturing an electrolyte layer for a fuel cell in the second aspect of the invention as described above, the electrolyte layer can be made thinner while controlling cross leaks of the gas passing through the electrolyte layer, so as to lower the resistance of the electrolyte layer, because the porous layer with electrolyte supported in the pores is provided on a compact substrate.

In the electrolyte layer for a fuel cell in the first aspect of the invention or the method of manufacturing an electrolyte layer for a fuel cell in the second aspect of the invention, the substrate may be hydrogen-permeable, and the electrolyte may be proton-conducting.

This arrangement will allow a proton-conductive electrolyte layer to be made thinner while preventing cross leaks between the fuel gas and oxidizing gas by means of the hydrogen-permeable substrate.

The use of an electrolyte in the form of a solid acid in the electrolyte layer for a fuel cell in the first aspect of the invention will allow the solid acid electrolyte layer to be made thinner.

In the method of manufacturing an electrolyte layer for a fuel cell in the second aspect of the invention, the electrolyte may be a solid acid, and the inorganic electrolyte may be supported in the pores by introducing a solution of a solid acid into the pores of the porous layer, and drying the porous element containing the solution.

This arrangement will allow a solid acid, which is a solid under the fuel cell operating conditions, to be readily supported in the pores of the porous layer.

The present invention can be realized in a variety of embodiments other than those described above. For example, it can be realized in the form of an embodiment of a fuel cell having an electrolytic membrane.

BRIEF DESCRIPTION OF THE DRAWINGS

FIG. 2 illustrates a process for manufacturing an MEA.

BEST MODE FOR IMPLEMENTING THE INVENTION

Figure 1:
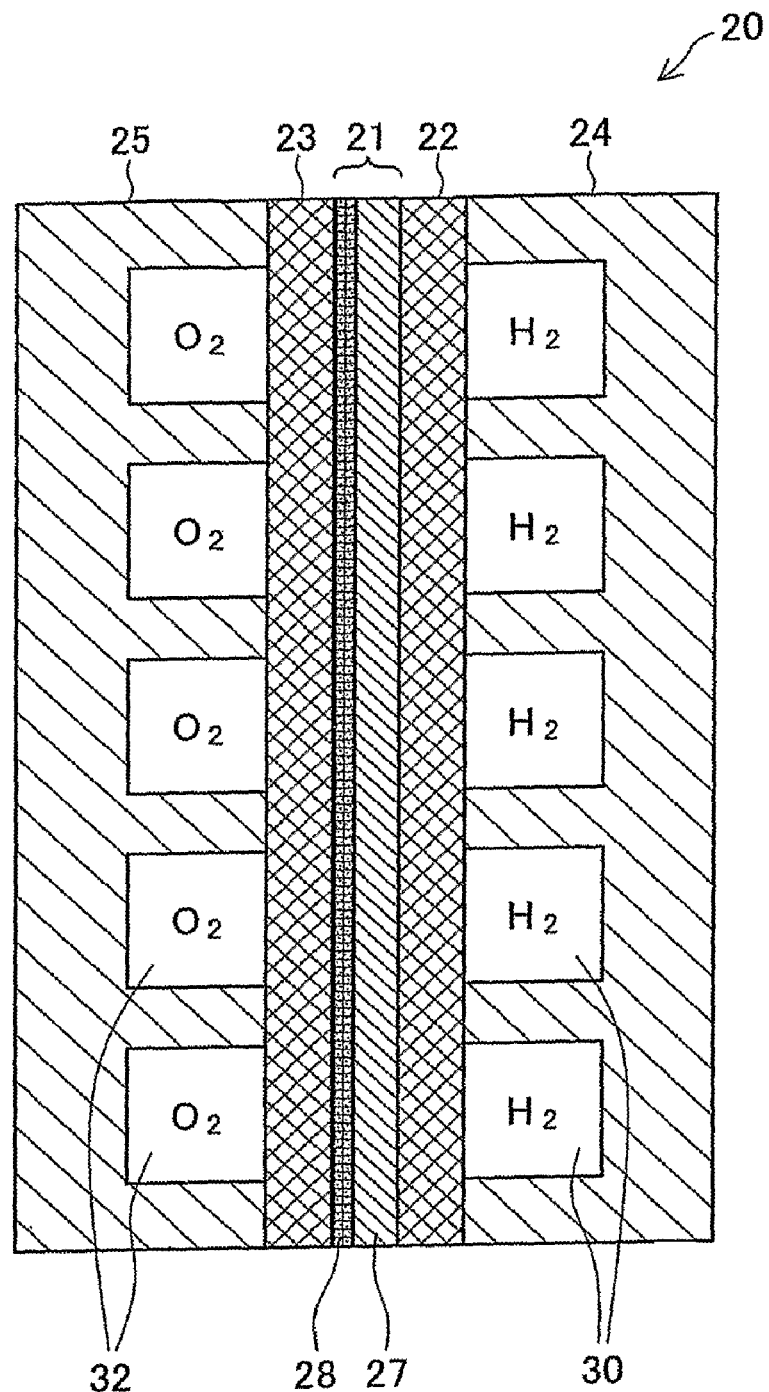
FIG. 1 is a schematic cross section of the structure of a single cell.

Embodiments for implementing the invention are illustrated as follows.

A. Structure of Fuel Cell

FIG. 1 is schematic cross section of the structure of the single cells 20 forming a fuel cell in a suitable embodiment of the invention. The single cell 20 comprises an electrolyte layer 21, gas diffusion electrodes 22 and 23 forming a sandwich structure on both sides of the electrolyte layer 2, and gas separators 24 and 25 flanking the sandwich structure. Fuel gas channels 30 through which the hydrogen-containing fuel gas passes in the single cell are formed between the gas separator 24 and gas diffusion electrode 22. Oxidizing gas channels 32 through which the hydrogen-containing oxidizing gas passes in the single cell are formed between the gas separator 25 and gas diffusion electrode 23. FIG. 1 shows a single cell 20, but in actual practice, the fuel cell of this embodiment has a stacked structure with several of the single cells 20 shown in FIG. 1 stacked upon each other. Although not illustrated, refrigerant channels may be provided to allow a refrigerant to pass through whenever a certain number of single cells is stacked up or between the single cells in order to control the internal temperature of the fuel cell.

The electrolyte layer 21 comprises a hydrogen-permeable metal layer 27 and an electrolyte component 28. The hydrogen-permeable metal layer 27 is a compact layer formed with a metal that is hydrogen-permeable. The hydrogen-permeable metal layer 27 can be formed with palladium (Pd) or a Pd alloy, for example. Alternatively, multi-layered films can also be produced, in which the substrate is formed of a Group V metal such as vanadium (V) (niobium, tantalum, and the like may also be used in addition to V) or Group V metal alloys, and Pd or Pd alloy layers are formed on at least one side (side in contact with the gas diffusion electrode 22). Activity for the dissociation of hydrogen molecules while the hydrogen passes through the hydrogen-permeable metal layer 27 may be ensured by providing a layer containing Pd (or Pd alloy) on at least the surface of the hydrogen-permeable metal layer 27 in contact with the gas diffusion electrode 22. The electrolyte component 28 comprises a porous support and an electrolyte supported in the pores of the support. In this embodiment, eutectic decomposed silica is used as the porous support, and cesium hydrogen sulfate ($CsHSO_4$) was used as the electrolyte. $CsHSO_4$ is a solid acid with proton conductivity. The detailed structure of the electrolyte layer 21 and a process for forming the electrolyte layer 21 correspond to the main elements of the invention, and are described in detail below.

The gas diffusion electrodes 22 and 23 are gas-permeable, conductive members. A catalyst (not shown) for promoting the electrochemical reaction (platinum catalyst in the present embodiment) is supported on the surface on the side in contact with the electrolyte layer 21. The gas diffusion electrodes 22 and 23 diffuse the fuel gas passing through the gas channels 30 in the single cell or the oxidizing gas channels 32 in the single cell, and act as collectors between the platinum catalyst and gas separator. In the present embodiment, the gas diffusion electrodes 22 and 23 are formed with carbon cloth, but other types of carbonaceous materials such as carbon felt or carbon paper, or metal members such as foam metal or metal mesh can also be used. In the present embodiment, the gas diffusion electrodes 22 and 23 both support the catalyst on the sides adjacent to the electrolyte layer 21, but the catalyst may also be left out between the gas diffusion electrode 22 and electrolyte layer 21 (hydrogen-permeable metal layer 27). As noted above, the surface of the hydrogen-permeable metal layer 27 has activity in the dissociation of hydrogen molecules, making it possible to forego the support of a catalyst on the gas diffusion electrode 22.

The gas separators 24 and 25 are gas-impermeable members formed with conductive materials. A certain textured shape is formed on the surface of the gas separators 24 and 25 to form the fuel gas channels 30 and oxidizing gas channels 32 in the single cell as described above. Thin, press molded carbon sheets are used as the separators 24 and 25 in this embodiment, but metal members formed with stainless steel and the like may also be used.

Hydrogen-rich gas obtained by reforming hydrocarbon fuel, or high purity hydrogen gas, may be used as the fuel gas supplied to the fuel cell. Air may be used, for example, as the oxidizing gas supplied to the fuel cell.

B. Manufacturing Process

A process for manufacturing a single cell 20 is described below. The structure in which the electrolyte layer 21 is flanked by the gas diffusion electrodes 22 and 23 is referred to as an MEA (membrane-electrode assembly). FIG. 2 illustrates a process for manufacturing an MEA.

When an MEA is produced, the hydrogen-permeable metal layer 27 is first prepared (Step S100). In this embodiment, the hydrogen-permeable metal layer 27 is 40 µm thick metal foil comprising a Pd alloy that contains gadolinium (Gd) in an amount of 8% (atomic percentage).

A porous layer is formed on the hydrogen-permeable metal layer 27 prepared in Step S100 (Step S110). As noted above, the porous layer is formed with eutectic decomposed silica in this embodiment. To form a layer of eutectic decomposed silica, a film is first formed by sputtering on the hydrogen-permeable metal layer 27 using a 7:3 mixture of iron oxide (FeO) and silicon oxide ($SiO_2$). The hydrogen-permeable metal layer 27 on which the mixture is formed into a layer is fired for 2 hours at 600° C. in air to convert the FeO and silicon oxide $SiO_2$ to eutectic form. The resulting film is then etched using a 15% hydrochloric acid aqueous solution to remove the iron oxide portion, giving a porous layer consisting of eutectic decomposed silica. The resulting porous layer has a structure with systematically disposed through holes that are continuous through the layer in the widthwise direction.

After the porous layer is formed, $CsHSO_4$ serving as the electrolyte is supported in the pores of the porous layer (Step S120). Specifically, the hydrogen-permeable metal layer 27 on which the porous support has been formed is dipped in a $CsHSO_4$ aqueous solution (50 wt %), and it is then placed for 5 minutes in a vacuum to allow the $CsHSO_4$ aqueous solution to be introduced into the pores. It is then allowed to dry for 2 hours at 90° C. in air to ensure that the $CsHSO_4$ is supported in the pores, forming the electrolyte component 28. The electrolyte layer 21 comprising the hydrogen-permeable metal layer 27 and electrolyte component 28 is thus completed.

The gas diffusion electrodes 22 and 23 are then disposed, with the surface on which the catalyst is supported facing the electrolyte layer 21 side, so as to flank the electrolyte layer 21 (Step S130), completing the MEA. Specifically, a paste containing carbon powder with platinum supported on the surface is applied onto two carbon cloths, the electrolyte layer 21 is flanked by the two carbon cloths in such a way that the coated surfaces each face the electrolyte layer 21 side, and they are hot pressed for 5 minutes at 150° C. and 1 ton/$cm^2$, so that the components are press bonded together.

During the assembly of the fuel cell, the gas separators 24 and 25 are disposed so as to flank the MEA prepared according to FIG. 2, thus forming a single cell 20. The prescribed number of such single cells 20 are stacked up on top of each other.

According to the method for manufacturing the fuel cell in this embodiment as formed above, the porous layer for internally supporting the electrolyte is formed on the hydrogen-permeable metal layer 27 in the electrolyte layer, so that cross leaks between the fuel gas and oxidizing gas through the electrolyte layer can be prevented by the hydrogen-permeable metal layer 27. The layer of electrolyte can thus be made thinner, allowing cell performance to be improved Thus making the electrolyte layer thinner to lower the resistance of the electrolyte layer allows the fuel cell to be operated at lower temperatures. The use of a solid acid such as $CsHSO_4$ in particular as the electrolyte allows a far better ion conductivity to be obtained at lower temperatures compared to ceramic ion conductors conventionally used as electrolytes in solid oxide type fuel cells. A solid acid such as $CsHSO_4$ such as can thus be used as the electrolyte to allow the fuel cell to be operated at a lower temperature (such as 150 to 400° C.) compared to conventional solid oxide types of fuel cells. The ability to operate at such lower temperatures allows the fuel cell to start up faster. Furthermore, because less heat resistance is required of the structural components compared to fuel cells operated at higher temperatures, a greater variety of materials can be selected more freely, allowing costs to be reduced. A fuel cell temperature range of 150 to 400° C. is closer to the temperature of the reforming reaction for hydrocarbon fuels with which the reforming reaction may progress at a relatively low temperature, such as methanol, ethanol, or dimethyl ether (DME). Thus, when such hydrocarbon fuels are used as reforming fuel, the resulting reforming gas may be supplied as fuel gas to the fuel cell without any special temperature control, allowing simpler system to be constructed for supplying fuel gas to the fuel cell.

Although solid acid also is readily water-soluble, the compact hydrogen-permeable metal layer 27 interposed between the solid acid and single cell fuel gas channels in the fuel cell of this embodiment can prevent the electrolyte from being dissolved by moisture in the fuel gas channels. Although volume of solid acid varies considerably between ambient temperature and the operating temperature of the fuel cell, because it is supported in the cells of the porous carrier, it is possible to prevent the durability of the fuel cell from being compromised by such changes in the volume of the electrolyte when a solid acid is used as the electrolyte.

C. Second Embodiment

A process for manufacturing a fuel cell in a second embodiment is described below. The fuel cell in the second embodiment has the same structure as the fuel cell in the first embodiment. The only difference is the material used for the electrolyte layer 21. The process for manufacturing the MEA will thus be described based on FIG. 2. Parts that are the same as in the first embodiment are indicated by the same symbols and will not be further elaborated.

The hydrogen-permeable metal layer 27 is prepared first (Step S100) to construct the MEA. In this embodiment, the hydrogen-permeable metal layer 27 is 40 um thick metal foil comprising a Pd alloy containing silver (Ag) in an amount of 23% (atomic percentage).

A porous layer is then formed on the hydrogen-permeable metal layer 27 that was prepared in Step S100 (Step S110). In this embodiment, the porous layer is formed with alumina oxide. To form an anodic alumina oxide layer, a 5 µm thick aluminum film is first formed by sputtering on the hydrogen-permeable metal layer 27. Anodic oxidation of the aluminum film allows an aluminum oxide film with systematically disposed through holes which are continuous in the thicknesswise direction to be formed from the aluminum film. The thickness of the aluminum oxide film and the depth of the through holes is adjustable by the time of the anodic oxidation treatment, but in this embodiment the entire aluminum film is oxidized to allow through holes to be formed throughout the entire film thickness. After the anodic oxidation, the aluminum oxide layer is etched with a phosphoric acid/chromic acid mixture to enlarge the through holes, completing the porous layer.

After the porous layer has been formed, cesium dihydrogen phosphate ($CsH_2PO_4$) is supported as the electrolyte in the pores of the porous layer (Step S120). Specifically, the hydrogen-permeable metal layer 27 on which the porous support has been formed is dipped in a $CsH_2PO_4$ aqueous solution (20 wt %), and it is then placed for 5 minutes in a vacuum to allow the $CsH_2PO_4$ aqueous solution to be introduced into the pores. It is then allowed to dry for 2 hours at 90° C. in air. The dipping and drying processes are repeated three times to ensure that the $CsH_2PO_4$ is supported in the pores, forming the electrolyte component 28. The electrolyte layer 21 comprising the hydrogen-permeable metal layer 27 and electrolyte component 28 is thus completed.

The MEA is then completed by Step S130 in the same manner as in the first embodiment. At that point in time in this embodiment, drops of the $CsH_2PO_4$ aqueous solution are added onto the surface of the electrolyte layer 21 to allow it to be laminated to carbon cloth, and they are hot pressed together. A single cell 20 is formed by disposing the gas separators 24 and 25 on both sides of the MEA, and the desired number of single cells 20 are stacked upon each other to assemble the fuel cell. The fuel cell of the second embodiment produced in this manner has the same effects as the first embodiment.

D. Third Embodiment

A process for manufacturing a fuel cell in a third embodiment is described below. The fuel cell in the third embodiment has the same structure as the fuel cell in the first embodiment. The only difference is the material used for the electrolyte layer 21. The process for manufacturing the MEA will thus be described based on FIG. 2. Parts that are the same as in the first embodiment are indicated by the same symbols and will not be further elaborated.

The hydrogen-permeable metal layer 27 is prepared first (Step S100) to construct the MEA. In this embodiment, a V metal alloy foil containing 8% (atomic percentage) nickel (Ni) is prepared, and 0.3 µm thick Pd layers are formed by electroless plating on both sides of the V alloy foil, giving a Pd/V—Ni/Pd triple-layered film for use as the hydrogen-permeable metal layer 27.

A porous layer is then formed on the hydrogen-permeable metal layer 27 prepared in Step S100 (Step S110). In this embodiment, the porous layer is formed with borosilicic acid porous glass. To form a layer of borosilicic acid porous glass, a 10 µm thick film of borosilicic acid glass ($SiO_2$=67.4%, $B_2O_3$=25.7%, $Na_2O$=6.9%) is first formed by sputtering on the hydrogen-permeable metal layer 27. The borosilicic acid glass film is then fired for 3 hours at 650° C. for phase separation, and is etched with hot acid to form a layer of borosilicic acid porous glass with at least 96% SiO2, giving a porous layer.

After the porous layer has been formed, potassium hydrogen phosphate ($K_3H(SO_4)_2$) is supported as the electrolyte in the pores of the porous layer (Step S120). Specifically, the hydrogen-permeable metal layer 27 on which the porous support has been formed is dipped in a $K_3H(SO_4)_2$ aqueous solution (30 wt %), and it is then placed for 5 minutes in a vacuum to allow the $K_3H(SO_4)_2$ aqueous solution to be introduced into the pores. It is then allowed to dry for 2 hours at 90° C. in air. It is then allowed to dry for 2 hours at 90° C. in air. to ensure that the $K_3H(SO_4)_2$ is supported in the pores, forming the electrolyte component 28. The electrolyte layer 21 comprising the hydrogen-permeable metal layer 27 and electrolyte component 28 is thus completed.

The MEA is then completed by Step S130 in the same manner as in the first embodiment. A single cell 20 is formed by disposing the gas separators 24 and 25 on both sides of the MEA, and the desired number of single cells 20 are stacked upon each other to assemble the fuel cell. The fuel cell of the third embodiment produced in this manner has the same effects as the first embodiment.

The pores in the borosilicic acid porous glass used as the porous layer in the third embodiment are formed randomly, not systematically as in the porous layers used in the first and second embodiments. In this case, since the pores are formed continuously in the thicknesswise direction of the porous layer as a whole, the solid acid supported in the pores still ensures that the proton conductivity is continuous in the thicknesswise direction of the film.

E. Modifications

The invention is not limited to the above embodiments, and can be implemented in a variety of embodiments, such as the following variants, without departing from the spirit of the invention.

(1) In Step S120 of the first through third embodiments, the process for dipping the porous layer in the solution containing the electrolyte and then drying it can be repeated the number of times suitable for the concentration of the electrolyte solution that is used. The electrolyte component 28 should be formed in such a way that the electrolyte is supported in the pores of the porous layer continuously in the thicknesswise direction of the porous layer, and protons are able to migrate from one side of the porous layer to the other side and in the electrolyte.

(2) In Step S130 in the second embodiment, drops of the electrolyte are added onto the electrolyte layer before it is hot pressed to the gas diffusion layers, but the need for this step will depend on the hot pressing conditions and the type of electrolyte (solid acid) that is used. The step for adding drops of the electrolyte solution onto the electrolyte layer 21 will ensure contact between the electrolyte and the catalyst supported on the gas diffusion electrode 23. Ensuring contact between the electrolyte and the catalyst will allow protons to be supplied smoothly to the catalyst on the gas diffusion electrode 23 during the electrochemical reaction. Depending on the melting point of the electrolyte (solid acid) that is used and the hot pressing temperature, the step for adding drops of the electrolyte solution onto the electrolyte layer 21 can be omitted when parts around the surface where the solid acid has been packed can be melted during hot pressing. Conditions such as the hot pressing temperature, pressure, and time can be adjusted as needed according to the hot pressing temperature and the ease with which the parts adhere to each other.

(3) In the first through third embodiments, there were different combinations of the metal forming the hydrogen-permeable metal layer 27, the porous material forming the porous layer, and the electrolyte, but various combinations of hydrogen-permeable metals, porous materials, and electrolytes may be selected as desired.

(4) In the first through third embodiments, the hydrogen-permeable metal layer 27 in the electrolyte layer 21 was disposed on the anode side, but the disposition on the anode side and cathode side are interchangeable. That is, the electrolyte layer 21 may be disposed so that the hydrogen-permeable metal layer 27 is on the cathode side and the electrolyte component 28 is on the anode side.

(5) In the first through third embodiments, a solid acid was used as the electrolyte supported in the pores of the porous layer, but different types of inorganic electrolytes may also be supported. For example, a liquid acid may be used as a proton-conductive electrolyte, and may be used to fill the pores of the porous layer. An electrolyte that is a liquid during the production of the electrolyte layer for a fuel cell may be used instead of the solid acids in the embodiments in order to produce the electrolyte layer for a fuel cell in the present invention. Examples of liquid acids include sulfuric acid, phosphoric acid, perchloric acid aqueous solution, and boric acid aqueous solution. When a liquid acid is thus used as the electrolyte when filling the pores, the compact substrate can prevent the liquid electrolyte from leaking out of the porous layer when power is being generated.

(6) An oxide ion conductive electrolyte may also be used as the electrolyte. Examples of oxide ion conductive electrolytes include various types of ceramic oxide ion conductors, such as zirconia oxide ion conductors, including yttria-stabilized zirconia (YSZ), and oxide ion conductors with a perovskite structure. In this case, oxygen-permeable compact layers should be used, instead of hydrogen-permeable metal layers, as the compact substrate to form the porous layer supporting the electrolyte. In other words, a better operating fuel cell can be obtained when the electrolyte supported by the porous layer on the substrate is an electrolyte that conducts the ions (protons when the gas is hydrogen, and oxide ions when the gas is oxygen) of the elements forming the gas (hydrogen or oxygen) supplied through the substrate to the electrochemical reaction. Oxygen-permeable compact layers can be formed by metal foil consisting of Ag or sinters consisting of $La_{0.7}Sr_{0.3}Ga_{0.6}Fe_{0.4}O_3$.

A porous layer is formed in the same manner as the examples on such an oxygen-permeable compact layer, and the above oxide ion-conducting electrolyte is supported in the pores of the porous layer. As a support method, a sol-gel method or polymer precursor method can be used to prepare a liquid containing a precursor of the above electrolyte, the porous layer may be impregnated with the solution containing the precursor to introduce the solution into the pores, and the layer can be fired to form the desired electrolyte from the precursor in the pores.

(7) The porous layer supporting the electrolyte may also be formed with materials in which the structural components have been chemically modified to provide the porous support itself with a certain degree of ion conductivity (the same ion conductivity as the electrolyte supported in the interior).

The invention claimed is:

1. A fuel cell comprising:
    an electrolyte layer comprising:
        a compact substrate having hydrogen-permeability;
        a porous layer having pores, wherein the porous layer is inorganic and comprises a thin film, porous body that is directly formed on the substrate; and
        an inorganic electrolyte having proton-conductivity and supported in the pores, wherein the electrolyte includes a solid acid; and
    an electrode disposed adjacent to the porous layer, on the side opposite the substrate.

2. The fuel cell according to claim 1, wherein the hydrogen permeable layer further comprises palladium.

3. A method of manufacturing a fuel cell, the method comprising:
    manufacturing an electrolyte layer by:
    preparing a compact substrate having hydrogen-permeability;
    forming, directly on the substrate, a porous layer having pores, wherein the porous layer is inorganic and comprises a thin film, porous body; and
    supporting an inorganic electrolyte having proton-conductivity in the pores, including:
    introducing a solution of a solid acid into the pores of the porous layer, and
    drying the porous layer containing the solution, and disposing an electrode adjacent to the porous layer, on the side opposite the substrate.

4. The method of manufacturing a fuel cell according to claim 3, wherein the hydrogen permeable layer further comprises palladium.

* * * * *